(12) United States Patent
Sandham

(10) Patent No.: US 9,690,614 B1
(45) Date of Patent: Jun. 27, 2017

(54) METHODS, SYSTEMS, AND COMPUTER READABLE MEDIUMS FOR ORCHESTRATING THE AUTOMATED INSTALLATION OF AN APPLICATION IN A VIRTUAL ENVIRONMENT

(71) Applicant: VCE Company, LLC, Richardson, TX (US)

(72) Inventor: Adrian John Sandham, Cork (IE)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 22 days.

(21) Appl. No.: 14/710,080

(22) Filed: May 12, 2015

(51) Int. Cl.
  *G06F 9/455* (2006.01)
  *G06F 9/445* (2006.01)
(52) U.S. Cl.
  CPC ........... *G06F 9/45558* (2013.01); *G06F 8/61* (2013.01); *G06F 2009/4557* (2013.01)
(58) Field of Classification Search
  None
  See application file for complete search history.

(56) References Cited

U.S. PATENT DOCUMENTS

| 2010/0107160 A1* | 4/2010 | Srinivasan | G06F 21/57 718/1 |
| 2012/0174095 A1* | 7/2012 | Natchadalingam | G06F 8/65 718/1 |
| 2013/0014107 A1* | 1/2013 | Kirchhofer | G06F 9/5083 718/1 |
| 2013/0132942 A1* | 5/2013 | Wang | G06F 9/45504 717/176 |
| 2014/0337940 A1* | 11/2014 | Slavov | H04W 8/26 726/5 |

* cited by examiner

*Primary Examiner* — Sisley Kim
(74) *Attorney, Agent, or Firm* — Jenkins, Wilson, Taylor & Hunt, P.A.

(57) ABSTRACT

Methods, systems, and computer readable mediums for orchestrating the automated installation of an application in a virtual environment are disclosed. According to one example, a method includes deploying a virtual machine hosting an application in a virtual environment and facilitating, via a mediation application programming interface (API), communication between the application and an orchestration layer manager managing the virtual environment. The method further includes receiving, by the orchestration layer manager, installation requirement information from the application via the mediation API and establishing, in the virtual environment, one or more supporting virtual machines respectively configured to host at least one supporting application specified by the installation requirement information.

20 Claims, 3 Drawing Sheets

METHODS, SYSTEMS, AND COMPUTER READABLE MEDIUMS FOR ORCHESTRATING THE AUTOMATED INSTALLATION OF AN APPLICATION IN A VIRTUAL ENVIRONMENT

TECHNICAL FIELD

The subject matter described herein relates to the installation of an application in a virtual environment. More specifically, the subject matter relates to methods, systems, and computer readable mediums for orchestrating the automated installation of an application in a virtual environment.

BACKGROUND

Information technology (IT) departments have embraced the capabilities of virtualization and cloud computing to move towards a more cost-effective and agile model of delivering IT as a service. Virtualization can provide efficient pooling and standardization of resources. Likewise, cloud computing can enable process automation mechanisms that allow users to consume infrastructure without manual provisioning and configuration. One of the key benefits generally afforded by cloud computing is the removal of the complexity and overhead associated with the ownership and management of one's own hardware and software components. While the introduction of cloud computing and virtualization services is of large benefit to end users and providers alike, configuration procedures associated with service initiation and/or service expansion involve significant overhead in designating and preparing the required network and compute resources prior to the configuration and installation of software. At present, network administrators may create a custom automation on a per environment basis or manually deploy the resources required and configure services where applicable. Notably, a person developing the automation for such processes requires a very strong knowledge of both i) the software that is being deployed and ii) the underlying logical and physical infrastructure to support the deployment. In addition to requiring a certain level of expertise, deploying required resources in this manner is an extremely time consuming task that can create deployment delays and usually results in a solution that is limited to the specific environment scenario.

SUMMARY

Methods, systems, and computer readable mediums for orchestrating the automated installation of an application in a virtual environment are disclosed. According to one embodiment, a method includes deploying a virtual machine hosting an application in a virtual environment and facilitating, via a mediation application programming interface (API), communication between the application and an orchestration layer manager managing the virtual environment. The method further includes receiving, by the orchestration layer manager, installation requirement information from the application via the mediation API and establishing, in the virtual environment, one or more supporting virtual machines respectively configured to host at least one supporting application specified by the installation requirement information.

BRIEF DESCRIPTION OF THE DRAWINGS

The Subject Matter Described Herein Will Now be Explained with Reference to the Accompanying Drawings of which.

DETAILED DESCRIPTION

The subject matter described herein includes methods, systems, and computer readable mediums for orchestrating the automated installation of an application in a virtual environment. In accordance with some aspects of the disclosed subject matter, functionality for orchestrating the automated installation of an application in a virtual environment can involve interacting with one or more converged infrastructure (CI) systems, such as an integrated infrastructure system (e.g., a Vblock® System from VCE Company, LLC), and/or computing system components (CSCs) therein. For example, a CI system can comprise multiple CSCs, such as physical resources and/or virtual resources, in a preconfigured or prepackaged computing platform, where some CSCs are developed and/or manufactured by multiple entities. For example, an exemplary CI system can comprise data storage devices, servers, networking equipment, and software for managing physical resources and/or virtualized resources (e.g., virtual servers). Although portions of the following disclosure describes the use of one or more CI systems, any integrated infrastructure system or device can be utilized without departing from the scope of the present subject matter. Alternatively, the following subject matter may be utilized by a distributed infrastructure system that may be configured to support one or more private and/or public cloud computing systems.

In accordance with some aspects of the disclosed subject matter, a computing platform (e.g., a node or device) or module (e.g., firmware, hardware, and/or software executing on a processor) can include functionality for orchestrating the automated installation of an application in a virtual environment. As used herein, installation refers to the setup process of a software application (or application object) that permits the software application ready for execution (e.g., by a processor). Similarly, as used herein, deployment refers to the creation of a virtual machine, it associated logical resources, and a supporting operating system where required.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
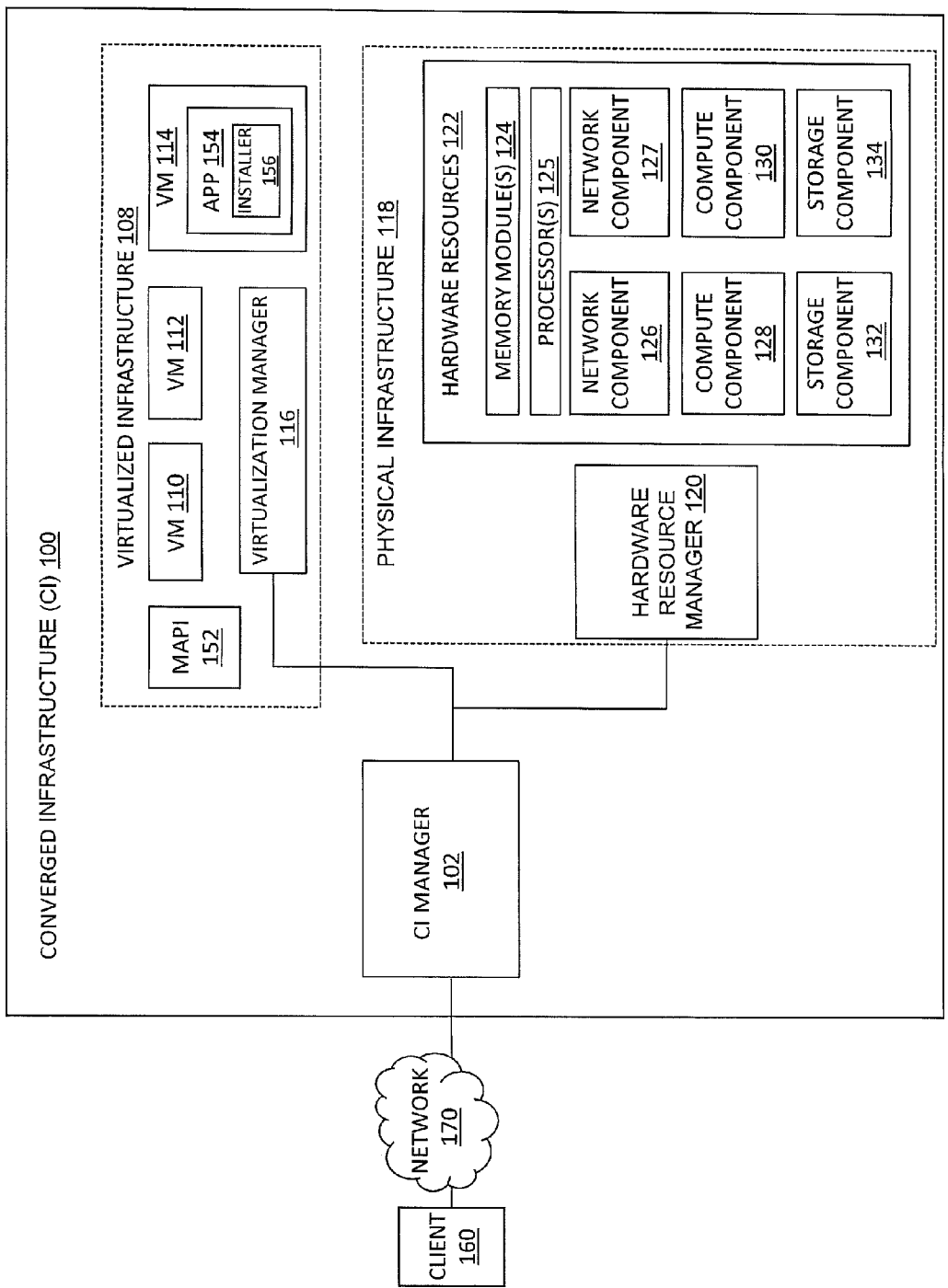
FIG. 1 is a diagram illustrating an exemplary converged infrastructure system configured to orchestrate the automated installation of an application in a virtual environment according to an embodiment of the subject matter described herein.

FIG. 1 is a block diagram illustrating an exemplary CI system 100 according to an embodiment of the subject matter described herein. Although the following disclosure describes the use of CI system 100, any type of computer system can be utilized without departing from the scope of the present subject matter. CI system 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CI systems), a virtual machine, a virtual server, a virtual storage device, a virtual port, and/or a virtual communications interface. CI system 100 can also comprise software and related components for managing the CI system and/or portions (e.g., CSCs) therein.

In some embodiments, CI system 100 can be configured to provide data management functionality, cloud service functionality, and/or other functionality. CI system 100 can be capable of communicating with other CI systems (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CI system 100, CSCs therein, and/or other entities. In some embodiments, client 160 can communicate directly with CI system 100 with or without using network 170.

In some embodiments, CI system 100 can comprise a CI manager 102, virtualized infrastructure 108, and/or physical infrastructure 118. CI manager 102 can be any suitable entity for managing aspects of CI system 100 or portions therein (e.g., CSCs or groups of CSCs). CI manager 102 can be configured to communicate with various CSCs and/or for managing various CSCs. For example, CI manager 102 can be configured to access each CSC within CI system 100 and return relevant information to client 160. For example, CI manager 102 can be configured to manage performance, resource utilization levels, and other aspects associated with virtualized infrastructure 108 and/or physical infrastructure 118. In some embodiments, CI manager 102 can comprise VCE Vision™ Intelligent Operations software and/or firmware.

In some embodiments, CI manager 102 can include a converged infrastructure management application for interacting with CI system 100 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI containing a query page for requesting information about a CI system 100 and/or CSCs therein.

CI manager 102 can comprise or interact with a mediation API 152. Mediation API 152 can be any suitable entity or module (e.g., hardware, firmware, and/or software executing on a processor) for performing one or more aspects associated with orchestrating the automated installation of an application in a virtual environment. In some embodiments, as shown in FIG. 1, mediation API 152 can be any suitable entity or entities (e.g., software executing on a virtual machine) for performing one or more aspects associated with orchestrating the automated installation of an application in a virtual environment. For example, mediation API 152 can be utilized to facilitate communication between an application or application object that is initially loaded and virtualization manager 116 of CI system 100. Mediation API 152 may, for example, be embodied as a software module that can be executed, when stored in any type of memory, by a physical and/or virtual processor.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users. As shown in FIG. 1, VM 114 may be designated to host an application 154, which may include an installer module 156. In some embodiments, installer module 156 may include any specialized program responsible for conducting the tasks necessary for installation. Installation may be part of a larger software deployment process.

In some embodiments, virtualized infrastructure 108 can be associated with one or more virtual entities. Each virtual entity can comprise one or more CI system or portions therein, e.g., CSCs from one or more CI systems. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs. Virtualization infrastructure 108 may further include a mediation API 152 that is configured to facilitate orchestration layer application self-registration process. In some embodiments, mediation API 152 may comprise a dedicated virtual machine configured to mediate communications between an application being installed in a virtual infrastructure 108 and the APIs corresponding to one or more orchestration layer managers, such as virtualization manager 116.

Physical infrastructure 118 can comprise hardware resources 122, such as memory module(s) 124, processor(s) 125, network components 126-127, compute components 128-130, and storage components 132-134 (e.g., functioning as a storage area network (SAN)). Hardware resources 122 can be communicatively connected to various other CSCs in CI system 100 and other entities. Hardware resources 122 can be configured for use by one or more virtual entities. For example, compute component 128 and storage component 132 may be used in implementing VM 110 and VM 112 while compute component 130 and storage component 134 may be used in implementing VM 114 and virtualization manager 116. In some embodiments, network components 126-127 (e.g., network switches) may be configured to enable communication between the components in CI system 100. In some embodiments, one or more file share storage (FSS) systems (not shown) can be utilized to provide file system level access to a CI system across a local area network (LAN).

In some embodiments, compute components 128-130 can include a hypervisor that may be configured to function as a host operating system and/or a virtual machine that runs as one or more guest applications (e.g., operating systems) within the hypervisor. As used herein, the term "hypervisor" can refer to computer software, firmware and/or hardware that is responsible for creating, hosting and managing guest virtual machines running on a host machine. In some embodiments, a hypervisor can be configured to function as a host operating system configured to support one or more guest operating systems. Notably, each guest operating system can function within the hypervisor as a virtual machine and provide a platform for executing various application workload services and/or enterprise applications. As previously indicated, compute components 128-130 can be configured to implement virtual machines 110-114, which in turn can be configured to host virtual entities including a virtual machine, a virtual server, a virtual storage device, a virtual port, and/or a virtual communications interface, and can require a virtualization software specific credential.

Hardware resource manager 120 can be any suitable entity (e.g., software executed by processor 125 or software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a unified computing system (UCS) director entity, which is configured to provision the physical hardware of CI system 100.

In some embodiments, processor(s) 125 can include a microprocessor (e.g., a trusted platform module (TPM) using trusted execution technology (TXT)), central processing unit (CPU), or any other like hardware based processor unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter (e.g., software algorithms corresponding to each of mediation API 152, application 154, installer module 156, etc.). In some embodiments, each of storage components 132-134 can include any storage medium or storage unit that is configured to store information accessible by processor(s) 125 via a system bus. In some embodiments, storage components 132-134 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions (e.g., software algorithm), which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, each of the mediation API and the installer application can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 128, compute component 130, and/or a specialized device or compute component (e.g., an application management pod (AMP)). In another example, CI manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

In some embodiments, the present subject matter may be utilized to manage the initial loading of an application (not shown) in physical infrastructure 118. Upon loading the application in hardware resources 122 (e.g., in storage component 134), virtualization manager 116 may be configured to access a virtual machine descriptor file in the application in order to deploy a virtual machine that is suitable (e.g., per specifications) to host the application in the virtual environment. For example, using the virtual machine descriptor file information, virtualization manager 116 may generate virtual machine 114 to host application 154 (which depicts the virtual representation of the application hosted in storage component 134). Once virtual machine 114 is established, virtual machine 114 initiates the installation of application 154. Prior to completing the installation process, an installer module 156 within application 154 is executed. In some embodiments, installer module 156 is pre-provisioned with the IP address (or other location information) corresponding to mediation API 152. Notably, installer module 156 may be configured to utilize this IP address to direct a message to mediation API 152 to establish a communications session. Mediation API 152, in turn, may be configured to select an appropriate orchestration layer manager for installer module 156 to communicate. Notably, the orchestration layer manager may be virtualization manager 116 or may be another manager located in another CI system, public cloud, and/or private cloud computing environment. In some alternate embodiments, mediation API 152 may prompt and/or query a user via client 160 to select an orchestration layer manager if there is more than one orchestration layer manager in which establish a communication.

In some embodiments, installer module 156 may be pre-provisioned with installation requirement information that may comprise a listing of all of the supporting applications and/or services that an instance of the hosted application requires to fully install and operate in virtual infrastructure 108. For example, installer module 156 may specify the hosted application object needs a web service application and a database storage application to fully function. Installer module 156 may be configured to forward the installation requirement information specifying the supporting application identities to virtualization manager 116 via the mediation API 152.

In some embodiments, virtualization manager 116 receives the installation requirement information and determines if each of the listed supporting applications is already provisioned or supported by VMs 110-114 in virtual infrastructure 108. If an instance of the supporting application already exists in a VM in virtual infrastructure 108, virtualization manager 116 does not create a new instance of the application (since virtualization manager 116 will instruct an application supported by a VM to support the application being installed). In some embodiments, an end-user may be presented (e.g., via client 106) with an option to utilize an existing instance or deploy a new instance of the application.

In the event an identified supporting application is not available and/or not provisioned in virtualized infrastructure 108, the entire process may be repeated in order to deploy the supporting application (and its own identified supporting applications) in a virtual machine in a supporting tier of virtualized infrastructure 108. For example, virtualization manager 116 may deploy a virtual machine (e.g., virtual machine 110) in a logical supporting tier (see FIG. 2 for a logical representation of tiers) and initiate the installation process of an application object corresponding to the specified supporting application. Specifically, a supporting application may include its own installer module that establishes communication with virtualization manager 116 via mediation API 152 and subsequently provide its own installation requirement information. After the supporting application is installed (and, if applicable, its own supporting applications are installed), virtualization manager 116 may fully install application 154 in deployed virtual machine 114.

Figure 2:
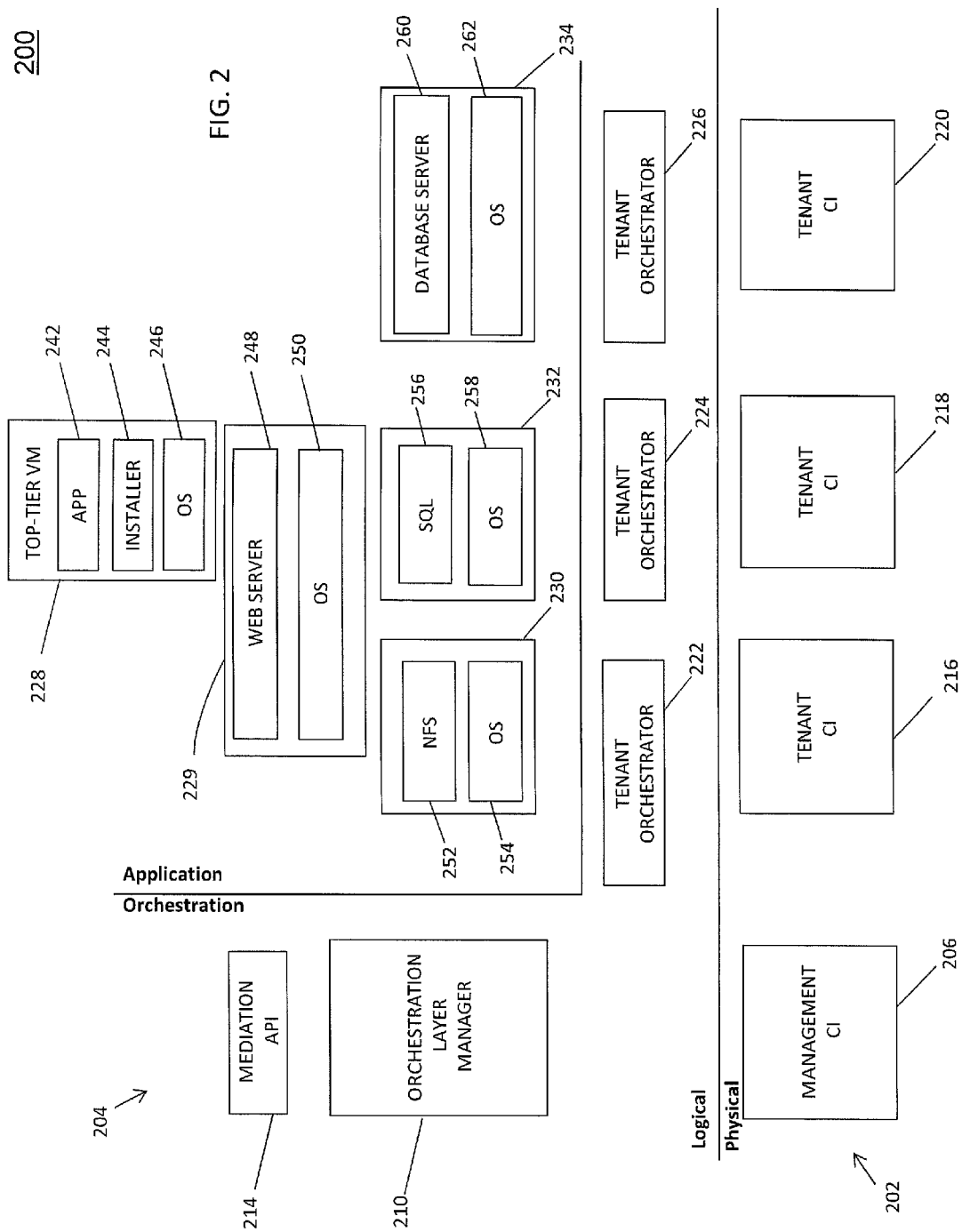
FIG. 2 is a diagram illustrating an exemplary system for orchestrating the automated installation of an application in a virtual environment according to an embodiment of the subject matter described herein.

FIG. 2 is a diagram illustrating a deployment architecture 200 for orchestrating the automated installation of an application in a virtual environment according to an embodiment of the subject matter described herein. Deployment architecture 200 can include one or more elements (e.g., subsystems, modules, and/or components) for performing one or more aspects associated with orchestrating the automated installation of an application in a virtual environment. Notably, deployment architecture 200 may comprise a physical infrastructure layer 202 that comprises a plurality of hardware based network elements, such as a management CI 206 and CIs 216-220. In some embodiments, physical infrastructure layer 202 may also be embodied by hardware components included in a CI, such as in physical infrastructure 118 depicted in FIG. 1. Alternatively, physical infrastructure layer 202 may also be embodied by cloud computing components. Although FIG. 2 depicts a plurality of CIs 206 and 216-218 as providing the underlying physical resources for virtual environment 204, any number (e.g., one or more) of CIs may be utilized. Notably, each of the underlying hardware CIs may host and/or support one or more components operating in virtual environment 204. For example, management CI 206 can be configured to host an orchestration layer manager 210 (e.g., similar to virtualization manager 116 described above) and a mediation API 214 configured to establish and facilitate communication between orchestration layer manager 210 and the virtual application components in the virtual environment 204. In some embodiments, mediation API 214 may further facilitate communications between other orchestration layer managers associated with other cloud computing environments (e.g., a orchestration layer manager associated with one or more public cloud environments, such as MICROSOFT Azure). In some embodiments, mediation API 214 is configured to receive request messages (e.g., registration requests) in a generic format from an installer module of an application to be deployed and subsequently translates the message into an appropriate form that is recognizable by an API associated with an orchestration layer manager (e.g., that is responsible for establishing a virtual machine to host the application).

Similarly, CIs 216-220 are configured to support a respective number of tenant orchestrators 222-226 that are responsible for orchestrating virtual applications hosted by tenant CIs 216-220. In some embodiments, tenant CIs 216-220 may be utilized by orchestration layer manager 210 to load balance the management of application workflows executed by the virtual machines residing in virtual environment 204. For example, virtual environment 204 depicted in FIG. 2 includes a plurality of virtual machines 228-234 that are configured to support various applications executing in virtual environment 204. As used herein, an application may comprise any software based application or any application object that is hosted by a virtual machine in virtual environment 204. As shown in FIG. 2, application 242 may comprise an object that is managed by orchestration layer manager 210 via mediation API 214. For example, suppose application 242 represents a software product that is to be deployed as a top-tier virtual machine 228 in virtual environment 204. Specifically, virtual machine 228 may comprise application 242, an operation system 246, an installer module 244 that may comprise executable binary file (i.e., can be executed by one or more processors residing in an underlying CI, such as CI 218). Notably, installer module 244 may be responsible for storing the installation requirement information corresponding to application 242 and for communicating with mediation API 214 in the manner described below. As used herein installation requirement information includes a predefined list of required supporting resources (e.g., supporting applications, required hardware and/or logical elements, etc.) that are needed to fully support the installation and subsequent operation of application 242 in virtual environment 204.

As indicated above, the present subject matter increases the efficiency associated with the automated installation process of software applications hosted in a virtual environment. For example, software manufacturers are afforded a control measure to manage the automated installation of their software product(s) on a customizable virtual machine. In some embodiments, orchestrator layer manager 210 can inspect an application loaded in physical infrastructure environment 202 in order to access a virtual machine descriptor file located within the application. Notably, the virtual machine descriptor file may comprise metadata or a file that specifies the virtual components (e.g., virtual processing core(s), virtual memory, virtual disk storage, etc.) a virtual machine would require in order to support the application in virtual environment 204. For example, orchestration tenant orchestrator 224 may configure a standard base virtual machine with the required operating system for an application running as the upper most component (i.e., the top-tier virtual machine) in the virtual environment 204. In some embodiments, virtual environment 204 may be described as having multiple tiers or logical layers in which the primary application to be executed is positioned in the highest or top-most tier and all supporting applications are positioned in supporting tiers (i.e., lower and/or preceding tiers in a logical configuration).

After virtual machine 228 is established and used to deploy application 242 in virtual environment 204, installer module 244 is initiated and accesses mediation API 214. In some embodiments, installer module 244 is pre-provisioned with the IP address corresponding to orchestration layer manager 210 and/or mediation API 214. Installer module 244 may also contain installation requirement information including a predefined list of required supporting applications that are needed to support the installation and subsequent operation of application 242 in virtual environment 204.

Prior to the completion of the top-tiered application's installation (e.g., during the initial steps of the installation), communication via mediation API 214 is established between an orchestration layer manager and the application by an associated installer module 244. For example, installer module 244 may initially establish a communications link with orchestration layer manager 210 via mediation API 214. In some embodiments, installer module 244 is provisioned with the IP address of mediation API 214. Once a communications link is established with API 214, installer module 244 may send a registration command message to API 214 requesting that application be deployed on a virtual machine in virtual environment 204. In some embodiments, mediation API 214 is configured to forward the registration command message to a single orchestration layer manager, such as manager 210. In other embodiment, mediation API 214 may be configured to establish communication with multiple orchestration layer managers (which manage the virtual environments associated with multiple private and/or public cloud infrastructures). In such a scenario, mediation API 214 may prompt a user to select which orchestration layer manager is to receive the registration command message. Alternatively, mediation API 214 may be configured to select one of a plurality of orchestration layer managers by using a preprogrammed selection method (e.g., round-robin, in accordance with a flag indicator or metadata provided in the registration command message, etc.).

After the orchestration layer manager is selected by the user (or some alternate means), installer module 244 may be configured to inform the selected orchestration layer manager (e.g., orchestration layer manager 210 shown in FIG. 2) of the required supporting resources specified in a predefined list or installation requirement information described above. For example, as part of the pre-installation stage, supporting applications required to supporting application 242 are specified and may be configured to communicate with the installer module 244 via mediation API 214. In FIG. 2, examples of supporting applications include applications 248, 252, 256, and 260. Further, installer module 244 may also be configured to query orchestration layer manager 210 (e.g., via the registration command message or by a separate query message) to determine if an instance of a required supporting application or resource is already operating in virtual environment 204.

As way of an example, if application 242 requires a database storage application (e.g., a dedicated external database application) and an Apache web server application to operate, installer module 244 may be configured to query orchestration layer manager 210 if virtual environment 204 already has a database storage service application and an Apache web server application currently instantiated and/or provisioned in virtual environment 204. Notably, if any of these support service applications already exist in virtual environment 204, orchestration layer manager 210 may be configured to not request the initiation of that service application. In some embodiments, orchestration layer manager 210 may query the user to decide whether to utilize an existing instance or initiate a new instance.

In contrast, if a supporting application in a lower supporting tier is not available and/or provisioned in the virtual environment 204, orchestration layer manager 210 may be configured to generate and deploy a virtual machine to host the supporting application in the same manner as described above with respect to application 242. For example, if orchestration layer manager 210 determines that a service application specified in the installation requirement information is not provisioned in virtual environment 204, orchestration layer manager 210 may create a new virtual machine in virtual environment 204 that is configured to host the supporting service application. In some embodiments, the supporting service application is deployed in a tier preceding (i.e., a 'lower' supporting tier) the tier supporting the requesting application. Using FIG. 2 as an example, application 242 may include installation requirement information that indicates the need for an web server application 248 (and operating system 250) and database server application 260 (and operating system 262), each of which are hosted by virtual machines 229 and 234, respectively. Notably, each of virtual machines 229 and 234 are operating on a lower supporting tier of virtual environment 204 as compared to top-tier virtual machine 228. Further, in some embodiments, each of applications 248 and 260 may also be configured with an installer module (not shown) that may include a specification listing (e.g., installation requirement information) indicating the requisite supporting applications. In this example, database server application 260 has no requisite applications, while web server application 248 (e.g., an Apache web server application) requires NFS application 252 and SQL service application 256 to operate. As such, the installer module in virtual machine 229 will communicate with orchestration layer manager 210 via mediation API 214 to provision virtual machines 230 (including support application 252 and operating system 254) and 232 (including support application 256 and operating system 258) in virtual environment 204 as described above.

After deploying and configuring its supporting virtual machines, top-tier virtual machine 228 is then able to fully install application 242. Notably, the provisioning of supporting virtual machines 229-234 (which are operating at lower tiers) of top-tier virtual machine 228 serves as an indication that all of the installation pre-requisites of top-tier virtual machine 228 have been satisfied.

In some embodiments, the present subject matter may be used to facilitate an auto-scaling feature in a private cloud environment. Specifically, the present subject matter may be leveraged to enable an application to create a duplicate instance or virtual node of itself. For example, an application (such an SFS NAS application) may register its own API IP address with the orchestration layer manager 210. Afterwards, an installer module on the SFS NAS application may communicate with mediation API 214 and call its own network flows and provision a new (i.e., second) instance of an SFS NAS application.

It will be appreciated that FIG. 2 is for illustrative purposes and that various components, their locations, and/or their functions as described above in relation to FIG. 2 can be changed, altered, added, or removed.

Figure 3:
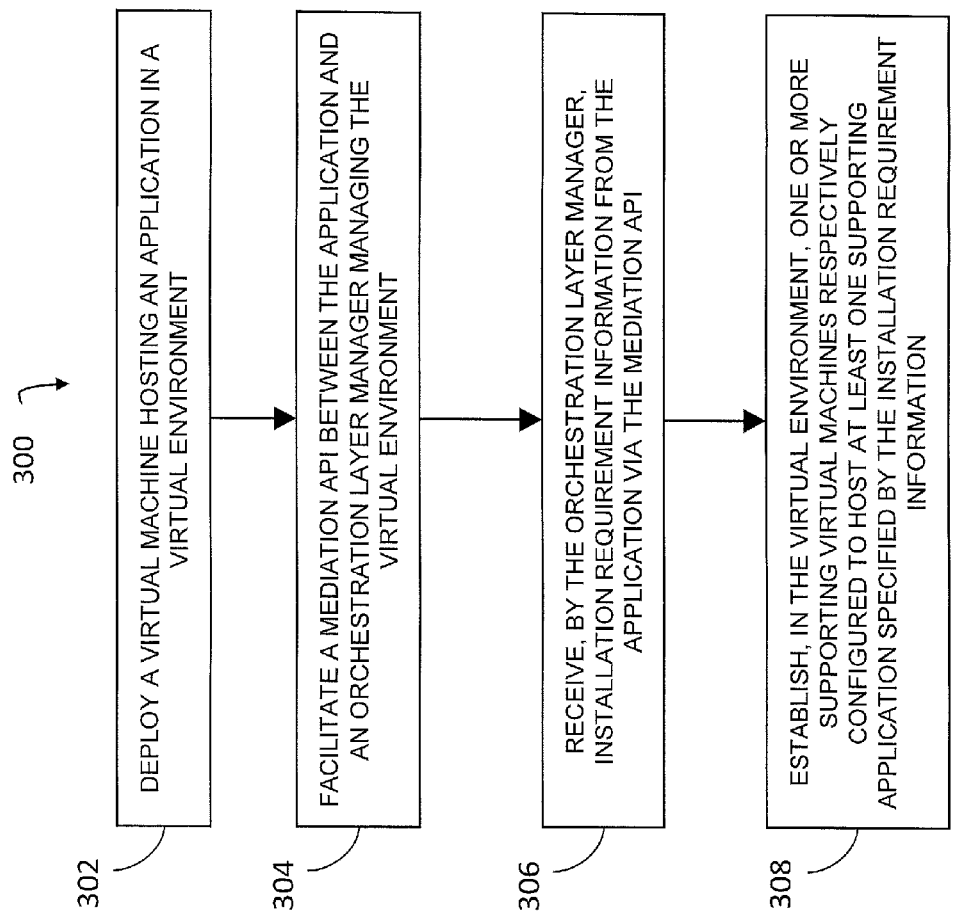
FIG. 3 is a diagram illustrating an exemplary method for orchestrating the automated installation of an application in a virtual environment according to an embodiment of the subject matter described herein.

FIG. 3 illustrates a flow chart of a method 300 for orchestrating the automated installation of an application in a virtual environment in accordance with embodiments of the subject matter described herein. In some embodiments, method 300 comprises a computer implemented method.

At step 302, a virtual machine supporting an application is deployed. In some embodiments, an orchestration layer manager inspects an application object (which may initially be loaded into the physical infrastructure) to access a virtual machine descriptor. Using the virtual machine descriptor, the orchestration layer manager may be configured to deploy a virtual machine that that satisfies the virtual descriptor in the application module. For example, the orchestration layer manager may provision the virtual machine with a virtual processing core, virtual memory, and an operating system that is sufficient to execute the application to be hosted. In some embodiments, the orchestration layer manager may designate the deployed virtual machine supporting the application to be assigned to the uppermost tier (e.g., top-tier virtual machine) component in the virtual environment.

At step 304, communication between the application and an orchestration layer manager is facilitated via a mediation API. For example, before the installation of the application has completed (e.g., during the initial stage(s) of the installation of the application), a mediation API receives a query message from an application to be installed. In some embodiments, the application includes an installer module that is configured to establish communications with the mediation API, which in turn is configured to establish communications with one or more orchestration layer managers. In some embodiments, the installer module is pre-provisioned with the IP address corresponding to the mediation API. Utilizing this IP address, the installer module directs a message to the mediation API to establish a communications session. At this stage, the mediation API may be configured to select an appropriate orchestration layer manager for the installer module to communicate. Alternatively, the mediation API may prompt and/or query a user to select an orchestration layer manager if there is more than one orchestration layer manager in which to establish communication.

At step 306, the orchestration layer manager receives installation requirement information from the application. In some embodiments, the installer module includes (e.g., pre-provisioned with) installation requirement information that may comprise a listing of the identities of all the supporting applications and/or services that an instance of the hosted application requires to fully install and operate in the virtual environment. For example, the installer module may specify the hosted application object needs a web service application (e.g., Apache web server) and a database storage application (e.g., Cassandra database storage) to fully function. At this stage, the installer module may forward the installation requirement information specifying the supporting application identities to the orchestration layer manager via the mediation API.

At step 308, one or more supporting virtual machines configured to host at least one supporting application specified by the installation requirement information is established (e.g., created, updated, and/or modified). In some embodiments, orchestration layer manager receives the installation requirement information and determines whether each of the listed supporting applications is already provisioned in the virtual environment. If an instance of the supporting application already exists in the virtual environment, the orchestration layer manager does not create a new instance of the application (since the orchestration layer manager will instruct the existing supporting application to support the top-tier application). In some embodiments, an end-user may be presented (e.g., via a GUI display) with an option to utilize an existing instance or deploy a new instance of the application.

If a supporting application is not available and/or not provisioned in the virtual environment, method 300 may be repeated to deploy the supporting application in a virtual machine in a supporting tier of the virtual environment. For example, the orchestration layer manager may deploy a virtual machine in a lower tier (e.g., a tier immediately below the top-tier as depicted in FIG. 2) and process an application module corresponding to the specified supporting application. Notably, the supporting application may include its own installer module that establishes communication with the orchestration layer manager via the aforementioned mediation API and subsequently provide its own installation requirement information. As an example, an installer module for the Apache web service application referenced in step 306 may include installation requirement information that specifies the need for support from an NFS service application and a database management system application (e.g., SQL service).

It will be appreciated that FIG. 3 is for illustrative purposes and that additional and/or different steps than those depicted in FIG. 3 can be usable for orchestrating the automated installation of an application in a virtual environment. Additionally, it will be appreciated that steps depicted in FIG. 3 can occur in a different order than depicted.

It should be noted that the mediation API, the installer module, and/or functionality described herein can individually and/or collectively constitute a special purpose computing system. Further, the mediation API, the installer module, and/or functionality described herein can improve the technological field of software provisioning systems by optimizing the application loading process based on the number and type of supporting application utilized by the application to function in a virtual environment. Notably, the present subject matter manages the available resources in a manner that efficiently installs applications only after all supporting applications are installed in the virtual environment such that technical complications, including incompatibilities, possible user errors, and considerable deployment delays are avoided or reduced.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
deploying a virtual machine hosting an application in a virtual environment;
facilitating, via a mediation application programming interface (API), communication between the application and an orchestration layer manager managing the virtual environment;
receiving, by the orchestration layer manager from the application, installation requirement information corresponding to the application via the mediation API, wherein the installation requirement information specifies at least one supporting application required by the application to fully install in the virtual environment; and
establishing, in the virtual environment, one or more supporting virtual machines respectively configured to host the at least one supporting application specified by the installation requirement information.

2. The method of claim 1 wherein the virtual machine is deployed in a top-tier of the virtual environment.

3. The method of claim 2 wherein the one or more supporting virtual machines are created in a supporting tier in the virtual environment.

4. The method of claim 1 wherein the one or more supporting applications are completely installed in the virtual environment prior to the application being completely installed on the virtual machine.

5. The method of claim 1 comprising querying the orchestration layer manager to determine whether the at least one supporting application associated with the installation requirement information is presently provisioned in the virtual environment.

6. The method of claim 5 wherein if the at least one supporting application is determined to not be presently provisioned in the virtual environment, conducting the deploying, establishing, communicating, and creating steps for the at least one supporting application.

7. The method of claim 1 wherein the application includes an installer module configured to establish the API and to communicate the installation requirement information to the orchestration layer manager.

8. A system comprising:
 at least one processor; and
 a memory; and
 wherein the memory stores an orchestration layer manager managing a virtual environment that when executed by the at least one processor is configured to deploy a virtual machine hosting an application in the virtual environment, facilitate communication between the application and the orchestration layer manager via a mediation application programming interface (API), receive, from the application, installation requirement information corresponding to the application via the mediation API, wherein the installation requirement information specifies at least one supporting application required by the application to fully install in the virtual environment, and establish one or more supporting virtual machines in the virtual environment that are respectively configured to host the at least one supporting application specified by the installation requirement information.

9. The system of claim 8 wherein the virtual machine is deployed in a top-tier of the virtual environment.

10. The system of claim 9 wherein the one or more supporting virtual machines are created in a supporting tier in the virtual environment.

11. The system of claim 8 wherein the one or more supporting applications are completely installed in the virtual environment prior to the application being completely installed on the virtual machine.

12. The system of claim 8 wherein the application is further configured to query the orchestration layer manager to determine whether the at least one supporting application associated with the installation requirement information is presently provisioned in the virtual environment.

13. The system of claim 12 wherein if the at least one supporting application is determined to not be presently provisioned in the virtual environment, the orchestration layer manager is further configured to conduct the deploying, facilitating, receiving, and establishing steps for the at least one supporting application.

14. The system of claim 8 wherein the application includes an installer module configured to establish the API and to communicate the installation requirement information to the orchestration layer manager.

15. A non-transitory computer readable medium having stored thereon executable instructions which, when executed by a processor of a computer, cause the computer to perform steps comprising:
 deploying a virtual machine hosting an application in a virtual environment;
 facilitating, via a mediation application programming interface (API), communication between the application and an orchestration layer manager managing the virtual environment;
 receiving, by the orchestration layer manager from the application, installation requirement information corresponding to the application via the mediation API, wherein the installation requirement information specifies at least one supporting application required by the application to fully install in the virtual environment; and
 establishing, in the virtual environment, one or more supporting virtual machines respectively configured to host the at least one supporting application specified by the installation requirement information.

16. The non-transitory computer readable medium of claim 15 wherein the virtual machine is deployed in a top-tier of the virtual environment.

17. The non-transitory computer readable medium of claim 16 wherein the one or more supporting virtual machines are created in a supporting tier in the virtual environment.

18. The non-transitory computer readable medium of claim 15 wherein the one or more supporting applications are completely installed in the virtual environment prior to the application being completely installed on the virtual machine.

19. The non-transitory computer readable medium of claim 15 comprising querying the orchestration layer manager to determine whether the at least one supporting application associated with the installation requirement information is presently provisioned in the virtual environment.

20. The non-transitory computer readable medium of claim 19 wherein if the at least one supporting application is determined to not be presently provisioned in the virtual environment, conducting the deploying, establishing, communicating, and creating steps for the at least one supporting application.

* * * * *